(12) United States Patent
Lee et al.

(10) Patent No.: US 11,036,740 B2
(45) Date of Patent: Jun. 15, 2021

(54) DATABASE MANAGEMENT SYSTEM QUERY PLAN CACHE MANAGEMENT

(71) Applicant: SAP SE, Walldorf (DE)

(72) Inventors: Sung Gun Lee, Seoul (KR); Sanghee Lee, Seoul (KR); Hyung Jo Yoon, Seoul (KR); Boyeong Jeong, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/567,260

(22) Filed: Sep. 11, 2019

(65) Prior Publication Data

US 2021/0073232 A1 Mar. 11, 2021

(51) Int. Cl.
*G06F 16/30* (2019.01)
*G06F 16/2455* (2019.01)
*G06F 16/2453* (2019.01)
*G06F 16/28* (2019.01)

(52) U.S. Cl.
CPC .. *G06F 16/24552* (2019.01); *G06F 16/24542* (2019.01); *G06F 16/284* (2019.01)

(58) Field of Classification Search
CPC ......... G06F 16/24552; G06F 16/24542; G06F 16/284
USPC .......................................................... 707/713
See application file for complete search history.

(56) References Cited

U.S. PATENT DOCUMENTS

| 2009/0106219 A1* | 4/2009 | Belknap ............ G06F 16/24545 |
| 2013/0304723 A1* | 11/2013 | Konik ............... G06F 16/24561 707/718 |
| 2018/0329955 A1* | 11/2018 | Chaudhuri ........ G06F 16/24545 |

OTHER PUBLICATIONS

Alapati: "Chapter 18 Improving Database Performance: SQL Query Optimization, Expert Oracle9i Database Administration", © Sam R. Alapati 2003 (Year: 2003).*

* cited by examiner

*Primary Examiner* — Kuen S Lu
(74) *Attorney, Agent, or Firm* — Buckley, Maschoff & Talwalkar LLC (57) ABSTRACT

According to some embodiments, a system to manage a query plan cache for a Database Management System ("DBMS") includes a DBMS query plan cache data store. The DBMS query plan cache data store may contain, for example, electronic records representing a plurality of query plans each associated with a set of instructions created in response to a query previously submitted by a user. A DBMS query plan cache management platform may then calculate a utility score for each query plan in the DBMS query plan cache data store. At least one query plan may be evicted from the DBMS query plan cache data store based on the calculated utility score, wherein the evicting is not based on a size of the DBMS query plan cache.

17 Claims, 6 Drawing Sheets

DATABASE MANAGEMENT SYSTEM QUERY PLAN CACHE MANAGEMENT

FIELD

Embodiments described herein generally relate to computer systems designed to support query processing. More particular, embodiments are associated with database management system query plan cache management.

BACKGROUND

In a Database Management System ("DBMS"), the term "plan" may refer to a set of specific instructions associated with execution of a query submitted by a user. Note that the compilation of a plan from a query can be resource intensive (e.g., using CPU time, memory, etc.) due to many complex steps that must be performed. A plan "cache" may refer to a logical container of plans that have already been compiled in response to previously submitted queries. Since plan compilation is an expensive operation, a DBMS typically attempts to re-use previously created plans whenever possible. Note that checking to see if a plan already exists in a plan cache is typically a relatively fast operation.

If a plan in the plan cache will never be used again, it is not worth being stored in the cached. It would be better to delete or evict that particular plan to free up memory for more useful work. Typically, a plan cache has an upper limit representing the size of all plans in the cache (e.g., a maximum 2 Gigabyte limit). When the size of the plan cache exceeds this value, the plan cache may begin to evict plans by prioritizing eviction targets with a Least-Recently-Used ("LRU") scheme.

Such an approach, however, only frees resources then the query plan cache has reached its storage limit (and does not address resources when the query plan cache is below that limit. It would be desirable to provide systems and methods to improve DBMS query plan cache management in an accurate and efficient manner.

SUMMARY OF THE INVENTION

According to some embodiments, systems, methods, apparatus, computer program code and means are provided to facilitate DBMS query plan cache management in an accurate and efficient manner. Some embodiments provide a system and method associated with a system to manage a query plan cache for a DBMS that includes a DBMS query plan cache data store. The DBMS query plan cache data store may contain, for example, electronic records representing a plurality of query plans each associated with a set of instructions created in response to a query previously submitted by a user. A DBMS query plan cache management platform may then calculate a utility score for each query plan in the DBMS query plan cache data store. At least one query plan may be evicted from the DBMS query plan cache data store based on the calculated utility score, wherein the evicting is not based on a size of the DBMS query plan cache.

Some embodiments comprise: means for calculating, by a DBMS query plan cache management platform, a utility score for each query plan in a DBMS query plan cache data store, wherein the DBMS query plan cache data store contains electronic records representing a plurality of query plans each associated with a set of instructions created in response to a query previously submitted by a user; and means for evicting, by the DBMS query plan cache management platform, at least one query plan from the DBMS query plan cache data store based on the calculated utility score, wherein said evicting is not based on a size of the DBMS query plan cache.

In some embodiments, a communication device associated with a DBMS query plan cache management platform exchanges information in connection with one or more interactive graphical user interfaces. The information may be exchanged, for example, via public and/or proprietary communication networks.

Technical effects of some embodiments of the invention are improved and computerized ways to facilitate DBMS query plan cache management in an accurate and efficient manner. With these and other advantages and features that will become hereinafter apparent, a more complete understanding of the nature of the invention can be obtained by referring to the following detailed description and to the associated drawings appended hereto.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for DBMS query plan cache management are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A DBMS may be capable of maintaining databases stored on Hard Disk Drives ("HDDs") and Solid-State Drives ("SSDs"), as well as in-memory databases that are stored in a main memory. In-memory databases may provide faster performance in comparison with disk-based databases due to reduced seek time when executing queries.

Figure 1:
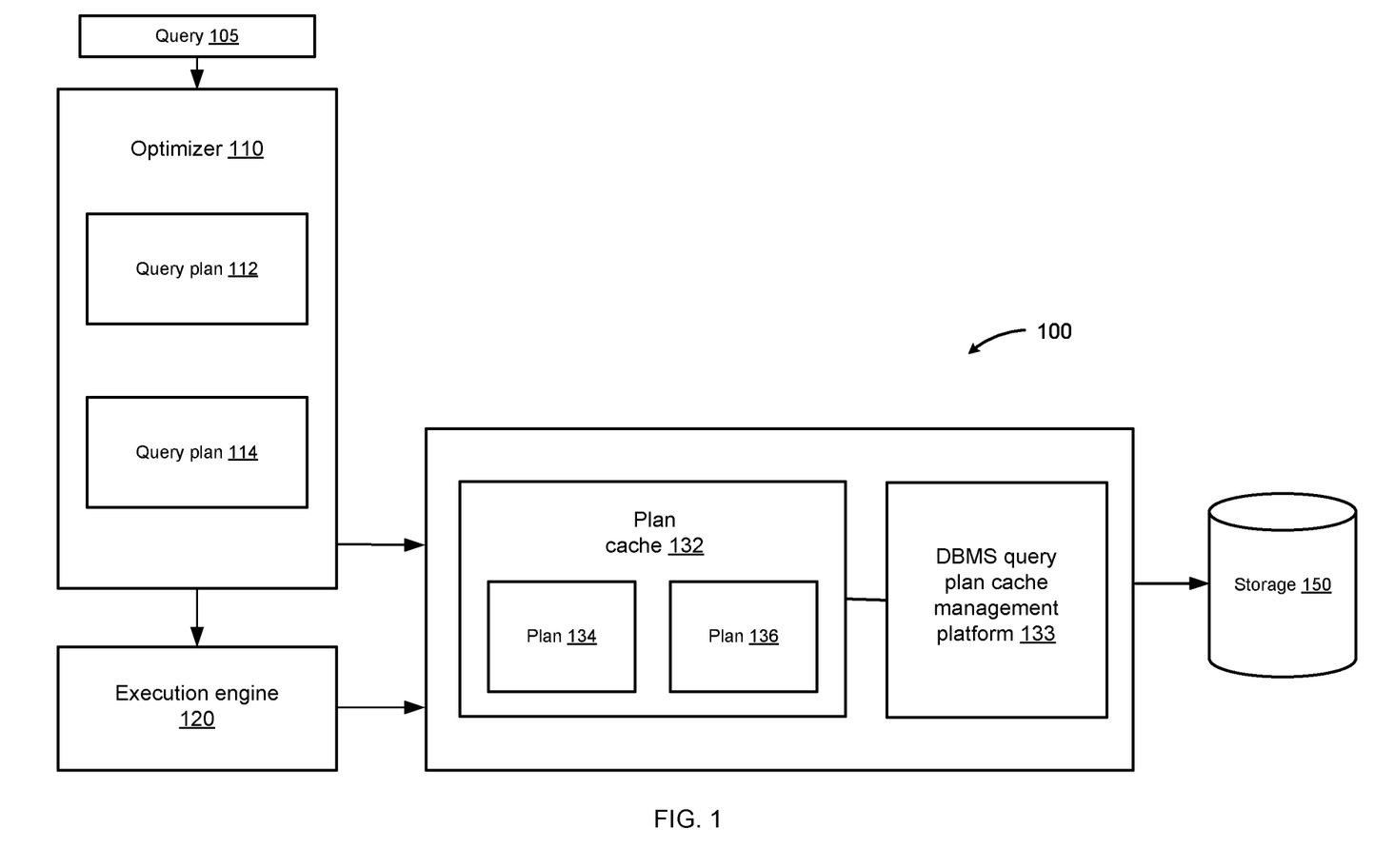
FIG. 1 is a block diagram illustrating architecture of system according to some embodiments.

FIG. 1 is a block diagram illustrating architecture of a system 100 according to one embodiment. In particular, the query plans 112, 114 are plans for execution of a query 105. A query plan may comprise a set of steps to process data in a DBMS (and the steps might be executed in order, in parallel, etc.).

In one embodiment, an optimizer 110 generates the query plans 112, 114 for execution of the query 105. The query plans 112, 114 may comprise, for example, data structures generated by the optimizer 110. According to some embodiments, each query plan 112, 114 may be a data structure that includes steps for execution of the query 105. In some embodiments, the optimizer 110 may be configured to generate query plans such as query plans 112, 114 when a DBMS is upgraded from an older DBMS version (e.g., version 1.0) to a newer DBMS version (e.g., version 2.0). The optimizer 110 may generate query plan 112 based on configuration settings that include one or more configuration parameters (e.g., setting a value of a configuration parameter to "on" or "off" may enable or disable a feature of a DBMS). For example, the optimizer 110 may load configuration settings of a DBMS version from a generic storage, such as storage 150.

In one embodiment, the optimizer 110 evaluates a number of possible query plans before generating the query plan 112. For example, the optimizer 110 may automatically assign an estimated cost to each of the number of query plans by evaluating execution order of operators included in the query 105 and various implementing algorithms for each operator. Based on the evaluation and the currently loaded configuration parameters, the optimizer 110 may determine a query plan with the lowest estimated cost from the number of query plans. The determined query plan (e.g., query plan 112) may then be generated by the optimizer 110.

In one embodiment, the optimizer 110 is configured to automatically execute a query plan 112 in test mode. During the execution in test mode of the query plan 112, an execution time for the query plan 112 may be captured. Execution time of a query plan is the time for execution of the query 105 in accordance with the corresponding query plan. In one embodiment, the optimizer 110 may execute a query plan 112 in test mode more than once. In this case, execution time of a query execution plan may be captured per single execution. An execution time parameter may be determined as an average of the values captured from the multiple query plan executions. The number of times a query plan is executed in test mode may be a configurable parameter, according to one embodiment. Upon each execution of the query plan 112 in test mode, a value of a counter corresponding to the query plan 112 may be increased by one. In this way, the optimizer 110 may determine whether test mode for the query plan is completed. For example, optimizer 110 may be configured to execute query plan 112 in test mode three times before calculating value of the execution time parameter of query plan 112.

In one embodiment, optimizer 110 executes the query plan 112 in test mode through an execution engine 120. The optimizer 110 may send the query plan 112 to the execution engine 120. Execution time of query plan 112 is captured during execution. Execution engine 120 executes queries by performing database functions necessary to process the query. The database functions include, but are not limited to, data dictionary management, data storage management, data transformation and presentation, security management, multiuser access control, backup and recovery management, data integrity management, database access languages and application programming interfaces, database communication interfaces, transaction management, updates, and logging. Note that query processing metrics may include, but are not limited to, Central Processing Unit ("CPU") time, logical input/output ("I/O") time, physical I/O time, etc.

In one embodiment, upon execution of each of query plan 112, 114, a query object corresponding to each query plan may be created. A plan cache 132 stores query plans 134, 136 previously generated for executed queries. In this way, generation of query plans 134, 136 for incoming queries that match a previously cached query can be avoided.

The current query execution plan (e.g., query plan 112) may be provided for execution of the query 105 on subsequent requests for execution of that query 105. When a current query execution plan is selected, the current query execution plan is stored in storage 150. In this way, when a DBMS server is started, the current query execution plan can be loaded into main memory from storage 150. In various embodiments, the storage 150 may be a disk-based storage device, flash memory storage device or another type of storage device utilizing non-volatile memory.

Figure 2:
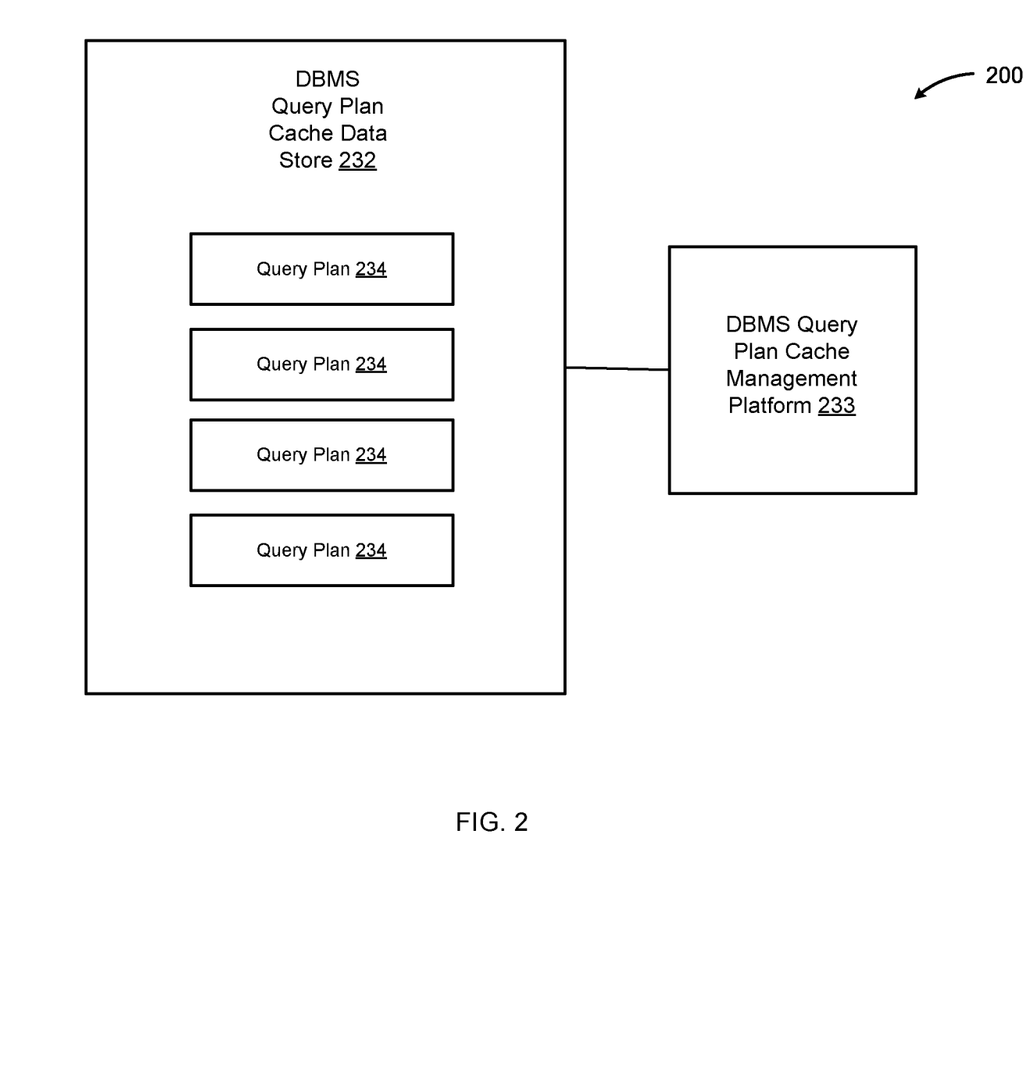
FIG. 2 is a high-level block diagram of a DBMS cache management system in accordance with some embodiments.

A DBMS query plan cache management platform 133 may monitor and/or adjust the storage of plans 134, 136 in the plan cache 132. For example, FIG. 2 is a high-level block diagram of a DBMS cache management system 200 in accordance with some embodiments. In particular, a DBMS query plan cache data store 232 contains a number of query plans 234 and a DBMS query plan cache management platform 233 may monitor and/or adjust the storage of those plans 234 (e.g., by periodically deleting or evicting plans 234 to free up memory and improve the overall performance of the system).

As used herein, devices, including those associated with the DBMS query plan cache management platform 233 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks. According to some embodiments, an "automated" DBMS query plan cache management platform 233 may evict query plans 234 from the cache data store 232. As used herein, the term "automated" may refer to, for example, actions that can be performed with little or no human intervention.

The DBMS query plan cache management platform 233 may store information into and/or retrieve information from databases (e.g., the DBMS query plan cache data store 232). The databases might be, for example, locally stored relational database or reside physically remote from the DBMS query plan cache management platform 233. The term "relational" may refer to, for example, a collection of data items organized as a set of formally described tables from which data can be accessed. Moreover, a Relational DBMS ("RDBMS") may be used in connection with any of the database tables described herein. According to some embodiments, a graphical operator interface may provide an ability to access and/or modify elements of the system 100 via remote devices. The operator interface might, for example, let an operator or administrator analyze cache performance, manage cache algorithms, etc.

Note that any number of DBMS query plan cache management platforms 233 might be included in the system 200. Moreover, various devices described herein might be combined according to embodiments of the present invention. For example, in some embodiments, the DBMS query plan cache management platform 233 and DBMS query plan cache data store 232 might be co-located and/or may comprise a single apparatus. Moreover, the functions described herein might be implemented in a cloud-based environment and/or by a service provider (e.g., performing services for one or more enterprises, departments, or businesses).

Figure 3:
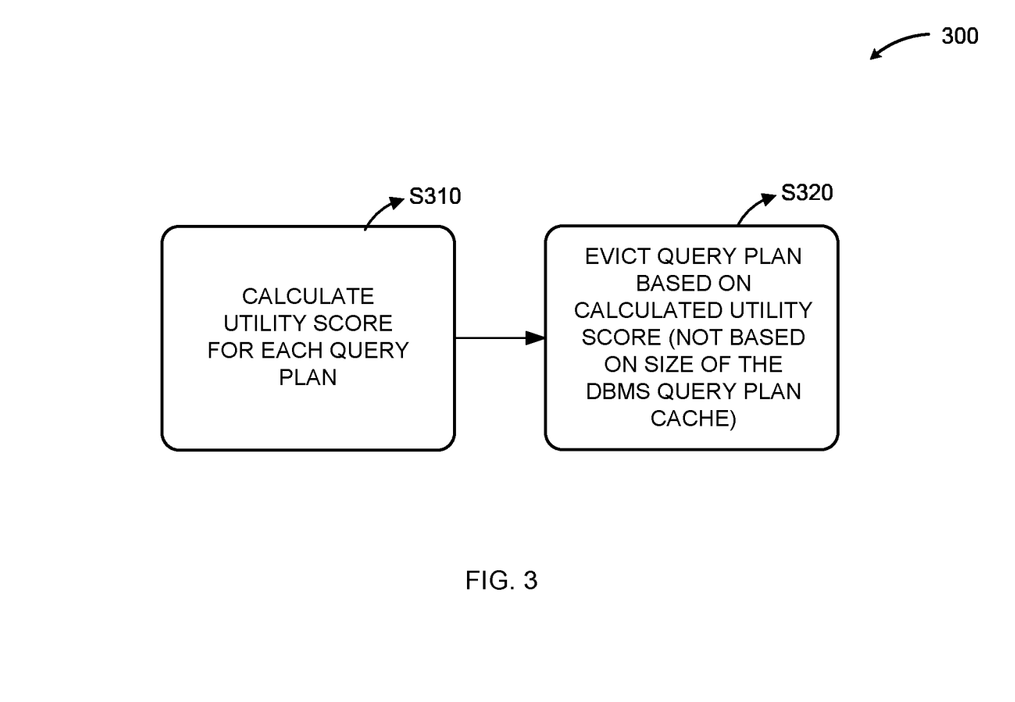
FIG. 3 is a DBMS cache management method according to some embodiments.

FIG. 3 illustrates a DBMS query plan cache management method 300 that might be performed by some or all of the elements of the systems 100, 200 described with respect to FIG. 1 or 2, respectively, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a DBMS query plan cache management platform (e.g., associated with an in-memory, column-oriented, relational database management system or any other type of DBMS) may calculate a utility score for each query plan in a DBMS query plan cache data store. The DBMS query plan cache data store may contain, for example, electronic records that represent a plurality of query plans each associated with a set of instructions created in response to a query previously submitted by a user. The utility score might be calculated, for example, for each query plan based on:

$$\text{utility score} = \frac{ec * ct}{lu * ms}$$

where ec represents an execution count, ct represents a compilation time, lu represents a period of time since the query plan was last used, and ms represents a query plan memory size.

At S320, the DBMS query plan cache management platform may evict at least one query plan from the DBMS query plan cache data store based on the calculated utility score. In some cases, depending on calculated utility scores and/or other parameters, the system might determine that no query plan is to be evicted from the DBMS query plan cache data store at this time. Note that, according to some embodiments, this evicting is not based on a size of the DBMS query plan cache. For example, the DBMS query plan cache management platform might evict a percentage of query plans (e.g., the bottom ten percent or some other pre-determined threshold value or a dynamically calculated value based on system conditions), a number of query plans (e.g., the bottom three query plans or some other pre-determined threshold value or a dynamically calculated value based on system conditions), all query plans having a utility score below a threshold value (e.g., a pre-determined threshold value or a dynamically calculated value based on system conditions), etc. Moreover, the evicting might be associated with deletion of a query plan from the system, transformation of a query plan (e.g., compression of an original set of query plan instructions into a compressed representation such that it may later be un-transformed back into the original set of query plan instructions), offloading a query plan to another storage medium, etc. According to some embodiments, the method 300 may be performed a periodic basis (e.g., once per hour), upon creation of a new query plan, upon creation of a pre-determined number of new query plans, upon re-use of a query plan, etc.

Although the eviction decision at S320 is not based on the size of the DBMS query plan cache (e.g., whether the cache is full), according to some embodiments the number of plans that will be evicted might be based at least in part on a current state of the plan cache. Note that the utility score may measure the usefulness by which all plans can be sorted, but the current plan cache size (or other DBMS system-wide memory conditions which might be associated with memory pressure) could be one of the factors that are used to decide how many of the plans to evict according to some embodiments.

Figure 4:
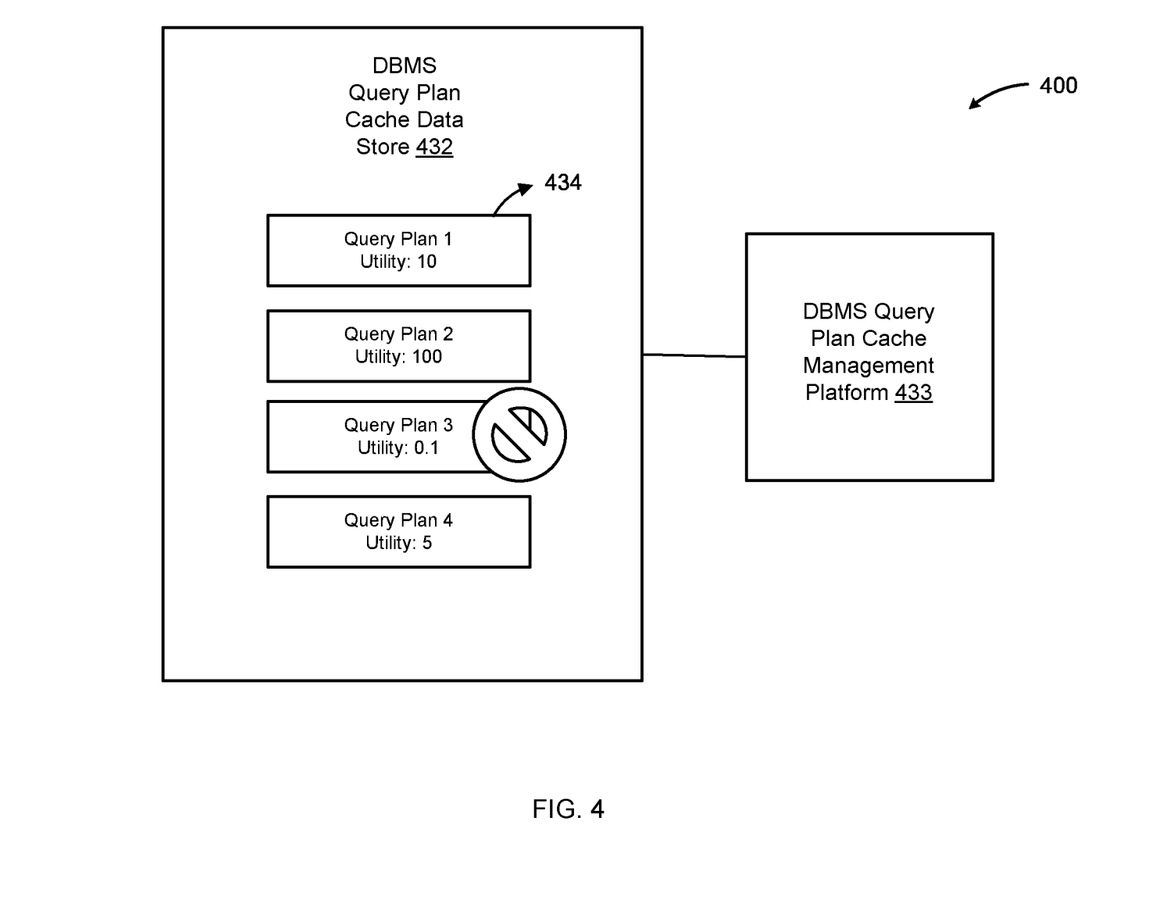
FIG. 4 is an example of DBMS cache management in accordance with some embodiments.

FIG. 4 is an example 400 of DBMS cache management in accordance with some embodiments. As before, a DBMS query plan cache data store 432 containing query plans 434 (e.g., 1 through 4) is coupled to a DBMS query plan cache management platform 433. In this example 400, the system evaluates how "useful" each cached plan 434 is with the following formula:

$$\text{utility} = \frac{\text{execution count} * \text{compilation time}}{\text{last time this plan used} * \text{plan memory size}}$$

Note that any of these values might be normalized, weighted, etc. and these parameters might be automatically selected or adjusted using a machine learning algorithm. The "utility" score serves as a relative metric of usefulness of each plan 434 and the system may evict plans 434 with low utility (e.g., plan 3 with a utility score of "0.1" might be evicted as illustrated in FIG. 4). For example, the system might evict the bottom 20% of the plans 434 with utility as the metric.

Note that the term "eviction" might represent the deletion of a plan 434. According to some embodiments, an eviction might represent other memory conserving techniques. For example, the system might use a plan transformation such that, after transformation, a plan 434 will be compressed and us less amount of memory (e.g., a 500 kb plan might be transformed into a 10 kb file) in exchange for transformation cost and un-transformation cost. Moreover, after a plan 434 is transformed it might be possible to serialize and offload the information onto disk-based storage (e.g., where the plan 434 is written to a persistent disk for much cheaper storage—freeing up valuable memory—in exchange for increased disk I/O overhead).

Figure 5:
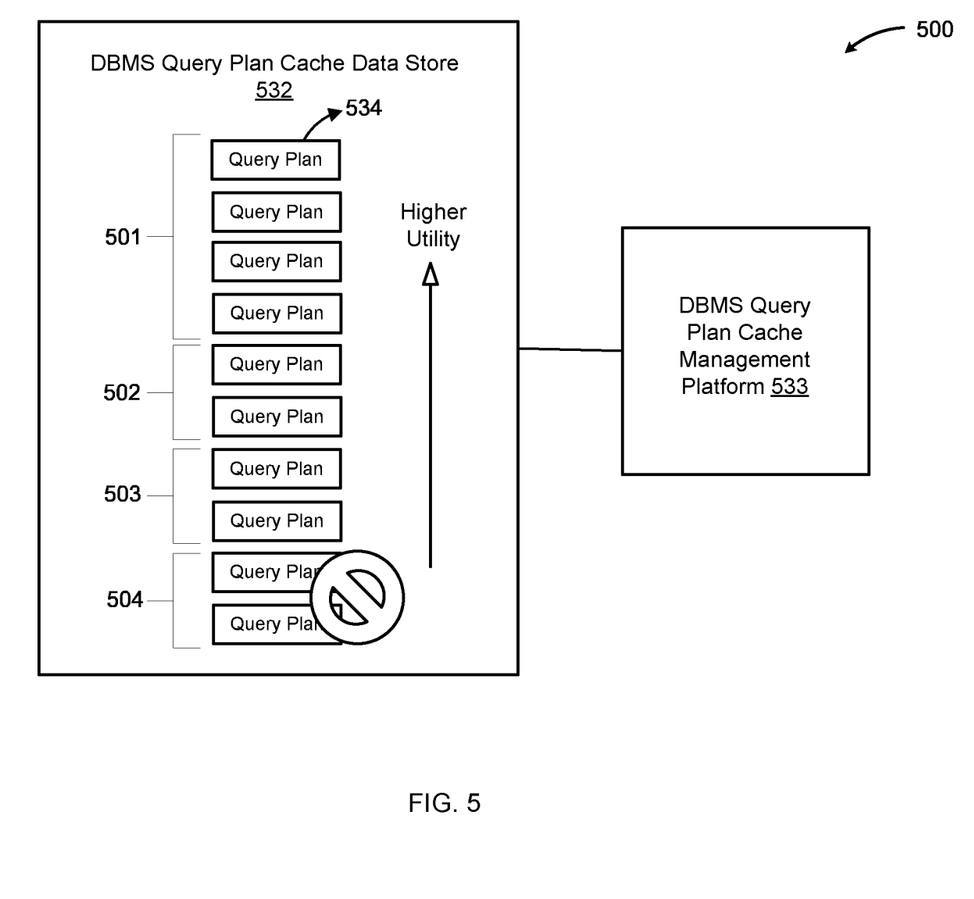
FIG. 5 is an example of DBMS cache management using multiple eviction options according to some embodiments.

Note that multiple eviction techniques might be combined in a single system. FIG. 5 is an example of 500 DBMS cache management using multiple eviction options according to some embodiments. As before, a DBMS query plan cache data store 532 containing query plans 534 is coupled to a DBMS query plan cache management platform 533. In this example, 500, the utility of all plans 534 in the plan cache 532 is calculated and the plans 534 are sorted by utility (with the most useful plans 534 being shown at the top of the list in FIG. 5).

The most useful plans 534 may remain in the DBMS query plan cache data store 532 unchanged 501 (e.g., because they are the ones most likely to be re-used in the future). Plans 534 with lower utility might be transformed by being compressed 502. Plans 534 with even lower utility might be both compressed and offloaded to disk 503. Finally, plans with the lowest utility (e.g., the bottom 10 percent) might be deleted (as being least likely to ever be used again).

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
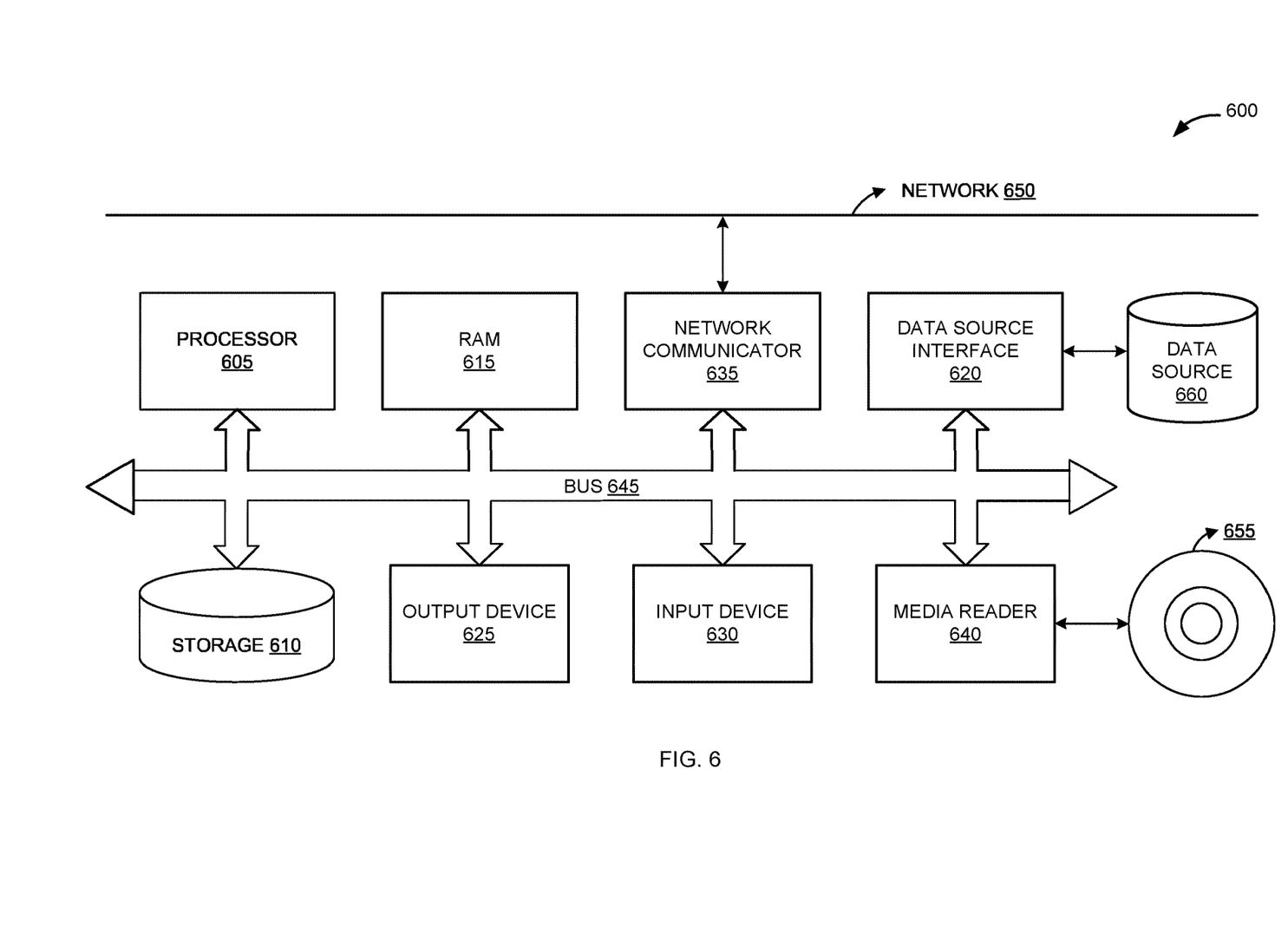
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in Random Access Memory ("RAM") 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 660. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., Online Analytical Processing ("OLAP")), object-oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity ("ODBC"), produced by an underlying software system (e.g., an Enterprise Resource Planning ("ERP") system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

The invention claimed is:

1. A system to manage a query plan cache for a Database Management System ("DBMS"), the method comprising:
   a DBMS query plan cache data store containing electronic records representing a plurality of query plans each associated with a set of instructions created in response to a query previously submitted by a user; and
   a DBMS query plan cache management platform, coupled to the DBMS query plan cache data store, including:
      a memory comprising computer executable instructions;
      at least one computer processor coupled to the memory to execute the instructions to perform actions comprising:
         calculating a utility score for each query plan in the DBMS query plan cache data store based on:

$$\text{utility score} = \frac{ec*ct}{lu*ms}$$

where ec represents an execution count, ct represents a compilation time, lu represents a period of time since the query plan was last used, and ms represents a query plan memory size, and
         evicting at least one query plan from the DBMS query plan cache data store based on the calculated utility score, wherein said evicting is not based on a size of the DBMS query plan cache.

2. The system of claim 1, wherein the DBMS query plan cache management platform evicts at least one of: (i) a percentage of query plans, (ii) a number of query plans, and (iii) all query plans having a utility score below a threshold value.

3. The system of claim 1, wherein said evicting is associated with at least one of: (i) deletion of a query plan from the system, (ii) transformation of a query plan, and (iii) offloading a query plan to another storage medium.

4. The system of claim 3, wherein said transformation of a query plan comprises compression of an original set of query plan instructions into a compressed representation such that it may later be un-transformed back into the original set of query plan instructions.

5. The system of claim 1, wherein the DBMS query plan cache management system performs said calculating and evicting based on at least one of: (i) a periodic basis, (ii) upon creation of a new query plan, (iii) upon creation of a pre-determined number of new query plans, and (iv) upon re-use of a query plan.

6. The system of claim 1, wherein the DBMS is an in-memory, column-oriented, relational database management system.

7. A computer-implemented method to manage a query plan cache for a Database Management System ("DBMS"), the method comprising:
   calculating, by a DBMS query plan cache management platform, a utility score for each query plan in a DBMS query plan cache data store based on:

$$\text{utility score} = \frac{ec*ct}{lu*ms}$$

where ec represents an execution count, ct represents a compilation time, lu represents a period of time since the query plan was last used, and ms represents a query plan memory size, wherein the DBMS query plan cache data store contains electronic records representing a plurality of query plans each associated with a set of instructions created in response to a query previously submitted by a user; and
      evicting, by the DBMS query plan cache management platform, at least one query plan from the DBMS query plan cache data store based on the calculated utility score, wherein said evicting is not based on a size of the DBMS query plan cache.

8. The method of claim 7, wherein the DBMS query plan cache management platform evicts at least one of: (i) a percentage of query plans, (ii) a number of query plans, and (iii) all query plans having a utility score below a threshold value.

9. The method of claim 7, wherein said evicting is associated with at least one of: (i) deletion of a query plan from the system, (ii) transformation of a query plan, and (iii) offloading a query plan to another storage medium.

10. The method of claim 9, wherein said transformation of a query plan comprises compression of an original set of query plan instructions into a compressed representation such that it may later be un-transformed back into the original set of query plan instructions.

11. The method of claim 7, wherein the DBMS query plan cache management system performs said calculating and evicting based on at least one of: (i) a periodic basis, (ii) upon creation of a new query plan, (iii) upon creation of a pre-determined number of new query plans, and (iv) upon re-use of a query plan.

12. The method of claim 7, wherein the DBMS is an in-memory, column-oriented, relational database management system.

13. A non-transitory, computer readable medium storing instructions, which when executed by at least one processor cause a computer to perform a method to manage a query plan cache for a Database Management System ("DBMS") comprising:
   calculating, by a DBMS query plan cache management platform, a utility score for each query plan in a DBMS query plan cache data store based on:

$$\text{utility score} = \frac{ec*ct}{lu*ms}$$

where ec represents an execution count, ct represents a compilation time, lu represents a period of time since the query plan was last used, and ms represents a query plan memory size an execution count, a compilation time, a period of time since the query plan was last used, and a query plan memory size, wherein the DBMS query plan cache data store contains electronic records representing a plurality of query plans each associated with a set of instructions created in response to a query previously submitted by a user; and     evicting, by the DBMS query plan cache management platform, at least one query plan from the DBMS query plan cache data store based on the calculated utility score, wherein said evicting is not based on a size of the DBMS query plan cache.

14. The medium of claim 13, wherein the DBMS query plan cache management platform evicts at least one of: (i) a percentage of query plans, (ii) a number of query plans, and (iii) all query plans having a utility score below a threshold value.

15. The medium of claim 13, wherein said evicting is associated with at least one of: (i) deletion of a query plan from the system, (ii) transformation of a query plan, and (iii) offloading a query plan to another storage medium.

16. The medium of claim 15, wherein said transformation of a query plan comprises compression of an original set of query plan instructions into a compressed representation such that it may later be un-transformed back into the original set of query plan instructions.

17. The medium of claim 13, wherein the DBMS query plan cache management system performs said calculating and evicting based on at least one of: (i) a periodic basis, (ii) upon creation of a new query plan, (iii) upon creation of a pre-determined number of new query plans, and (iv) upon re-use of a query plan.

\* \* \* \* \*